(12) United States Patent
Apsitis et al.

(10) Patent No.: US 12,201,903 B2
(45) Date of Patent: Jan. 21, 2025

(54) SYSTEM AND METHOD FOR EXECUTING AN INTERACTIVE LIVE GAME

(71) Applicant: Playtech Software Limited, London (GB)

(72) Inventors: Artis Apsitis, Ikskile (LV); Edo Haitin, Riga (LV)

(73) Assignee: PLAYTECH SOFTWARE LIMITED, London (GB)

( * ) Notice: Subject to any disclaimer, the term of this patent is extended or adjusted under 35 U.S.C. 154(b) by 0 days.

(21) Appl. No.: 18/295,943

(22) Filed: Apr. 5, 2023

(65) Prior Publication Data

US 2024/0307772 A1 Sep. 19, 2024

(30) Foreign Application Priority Data

Mar. 14, 2023 (EP) ..................................... 23161880

(51) Int. Cl.
*G07F 17/32* (2006.01)
*A63F 13/35* (2014.01)
*A63F 13/52* (2014.01)

(52) U.S. Cl.
CPC ............. *A63F 13/52* (2014.09); *A63F 13/35* (2014.09); *G07F 17/3288* (2013.01); *G07F 17/3272* (2013.01)

(58) Field of Classification Search
None
See application file for complete search history.

(56) References Cited

U.S. PATENT DOCUMENTS

| 2012/0094737 | A1  | 4/2012  | Barclay et al. |
| 2013/0101134 | A1* | 4/2013  | Betts-Lacroix ........... H04S 7/30 381/80 |
| 2015/0302690 | A1  | 10/2015 | Hutchnson-Kay et al. |
| 2017/0300116 | A1* | 10/2017 | Lyons ..................... G06F 3/016 |

FOREIGN PATENT DOCUMENTS

| CN | 114615556 A | 6/2022 |
| EP | 3236437 A1  | 10/2017 |
| EP | 3827889 A1  | 6/2021 |

* cited by examiner

*Primary Examiner* — Damon J Pierce
(74) *Attorney, Agent, or Firm* — FISHERBROYLES, LLP; Roger L. Browdy; James E. Mrose

(57) ABSTRACT

A computerized method for facilitating execution of an interactive live game by a processor of a game server, is provided. The method includes receiving a request of a player to participate in an interactive live game; executing an interactive game; based on the executed game, transmitting, to a video processor, game display data and virtual reality data, the virtual reality data including data pertaining a virtual reality environment comprising at least two themes. Based on the executed game, transmitting game events, thereby facilitating the player's device to create a composited video stream comprising a live game video stream captured in a live studio in which an operator operating a mobile activation button, and data that pertains to the generated game events. In response to receiving an input from the mobile activation button, game server transmits transition data indicative of switching between the at least two themes in the environment.

8 Claims, 8 Drawing Sheets

SYSTEM AND METHOD FOR EXECUTING AN INTERACTIVE LIVE GAME

CROSS-REFERENCES TO RELATED APPLICATIONS

The present application claims benefit from EP 23161880.2 filed on Mar. 14, 2023, incorporated hereby by reference in their entirety.

TECHNICAL FIELD

The presently disclosed subject matter relates to computerized gaming systems, and more particularly to executing an interactive game.

BACKGROUND

The online gaming industry has been enjoying ongoing growth. There is a continuous desire to enhance the player's experience in online games, as if he is participating in a real physical casino game. In some known games, the player communicates with a gaming system which operates a casino game, where the game is accompanied by casino-like animation. With a further attempt to facilitate the live atmosphere of the game to the player, live games have been developed. In existing live casino games, a live dealer in a real casino operates a casino game through a physical casino device. A video of the casino, along with the dealer and the operated game, are communicated to a remote player. When the remote player wishes to join the game, he communicates with a gaming system, located at the physical casino, which creates a connection between the player and the dealer in the casino. The connection enables the player to join the game that is operated in the casino itself. However, in such live games, the game is operated in a physical manner in the casino, and the gaming system, which may be connected to the physical game, receives data on the outcome and operation of the physical game. In addition, the player's experience in such live gaming systems is limited to watching a video of a casino game operated by a dealer, and to participate in a remote game which is recorded by video and is shown on the screen.

Alongside enhancement of online games for players, virtual reality environments are evolving, where environments are generated by computers with scenes and objects that appear to be real.

There is therefore a desire to enhance the player's experience in participating in an online game.

GENERAL DESCRIPTION

According to a first aspect of the presently disclosed subject matter, there is a computerized method for facilitating execution of an interactive live game, the method comprising, by a processor of a game server:
receiving from a player's device a request of a player to participate in an interactive live game;
repeatedly:
executing an interactive game, including generating game events;
based on the executed game, transmitting, to a video processor, game display data and virtual reality data, the virtual reality data including data pertaining a virtual reality environment comprising at least two themes, wherein the transmitted data is used to create, by the video processor, together with a captured video of a live studio in which an operator operating a mobile activation button, a live game video stream;
transmitting to the player's device the generated game events, thereby facilitating the player's device, after obtaining the live game video stream, to create a composited video stream comprising the live game video stream and data that pertains to the generated game events, the composited video stream constituting the interactive live game;
wherein at least some of the events are generated in response to receiving data indicative of a player's action in the executed interactive game; and
in response to receiving an input from the mobile activation button, transmitting transition data indicative of switching between the at least two themes in the environment.

In addition to the above features, the computer implemented method according to this aspect of the presently disclosed subject matter can optionally comprise in some examples one or more of features (i) to (iv) below, in any technically possible combination or permutation:
(i). Wherein the at least two themes are different themes, and wherein the operator is positioned in a different position in each of the at least two themes.
(ii). The method further comprising:
in response to receiving the input, generating a transition game event indicative of a transition from one theme into another in the environment; and
transmitting virtual reality data pertaining to the transition game event.
(iii). Wherein the mobile activation button comprises wireless buttons that are mounted on a wireless microphone and enables the operator to freely move around the studio, irrespective of the theme.
(iv). Wherein the operator is positioned in a different location in at least two of the themes.

The presently disclosed subject matter further comprises a computer game server for facilitating execution of an interactive live game, the server comprising a processing circuitry that comprises at least one processor and a computer memory, the processing circuitry is configured to execute a method as described above with reference to the first aspect and may optionally further comprise one or more of the features (i) to (iv) listed above, mutatis mutandis, in any technically possible combination or permutation.

The presently disclosed subject matter further comprises a non-transitory computer readable storage medium tangibly embodying a program of instructions that, when executed by a computer, cause the computer to perform a method for facilitating execution of an interactive live game as described above with reference the first aspect, and may optionally further comprise one or more of the features (i) to (iv) listed above, mutatis mutandis, in any technically possible combination or permutation.

According to a second aspect of the presently disclosed subject matter, there is further provided a gaming system for facilitating execution of an interactive live game, the gaming system, comprising:
a live game server configured to:
receive from a player's device a request of a player to participate in an interactive live game; and
repeatedly:
execute an interactive game, including generating game events;
transmit, to a video processor, game display data, and virtual reality data, the virtual reality data including data pertaining a virtual reality environment comprising at least two themes;

transmit to a player's device the generated game events; wherein at least some of the events are generated in response to receiving data indicative of a player's action in the executed interactive game; and wherein, in response to receiving an input from the mobile activation button, transmitting transition data indicative of switching between the at least two themes in the environment;

at least one camera positioned in a live studio is configured to capture a video of a live studio in which an operator operating a mobile activation button to create a live game video stream and to live stream the captured video;

a game renderer configured to receive the data pertaining to the game display data and the virtual reality data from the live game server, to determine game display data and virtual reality data, and to transmit the determined data to a video processor;

a video processor configured to receive the captured video from the at least one camera, receive the game display data and the virtual reality data from the game renderer, to create a live game video stream, and to transmit the live game video to the player's device;

thereby facilitating the player's device, after obtaining from the video processor the live game video stream, together with the game events, to create a composited synchronous video comprising the obtained live game video stream and data that pertains to the game events, wherein the composited synchronous video constitutes the interactive live game.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

Figure 1:
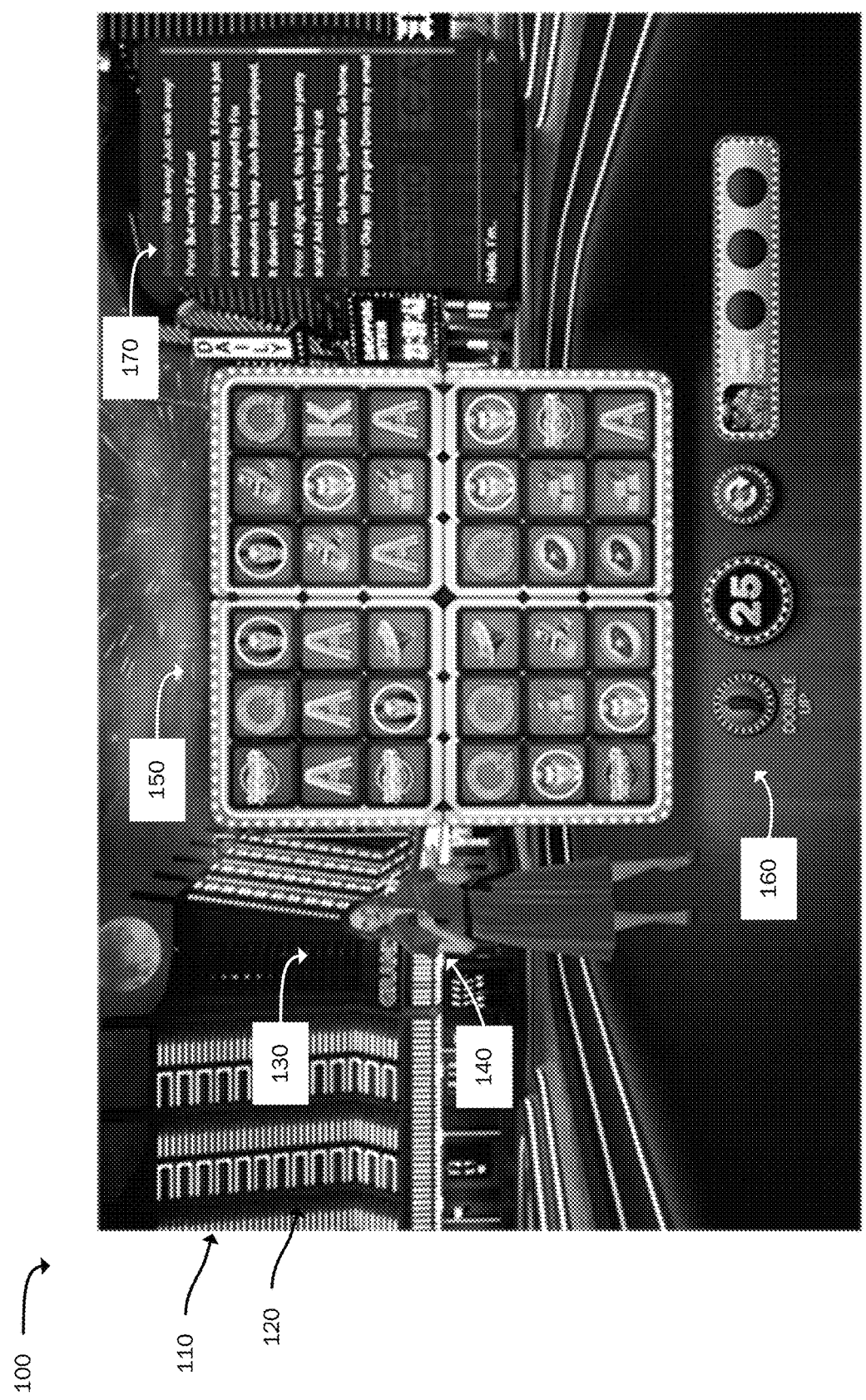
FIGS. 1-5 illustrate several examples of optional screenshots of a gaming application, in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components, and circuits have not been described in detail so as not to obscure the presently disclosed subject matter.

Unless specifically stated otherwise, as apparent from the following discussions, it is appreciated that throughout the specification discussions utilizing terms such as "facilitating", "receiving", "sending", "executing" "processing", "transmitting", "creating", "associating", "obtaining", ""generating",", "storing", "executing", "determining", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including a personal computer, a server, a computing system, a communication device, a processor or processing unit (e.g., digital signal processor (DSP), a microcontroller, a microprocessor, a field programmable gate array (FPGA), an application specific integrated circuit (ASIC), etc.), and any other electronic computing device, including, by way of non-limiting example, computerized systems or devices such as live gaming server 620 or the gaming system of FIG. 6 disclosed in the present application. The term "computer" should be expansively construed to cover any kind of hardware-based electronic device with data processing capabilities including, by way of non-limiting example, the live game server or the player's device disclosed in the present application.

The terms "non-transitory memory" and "non-transitory storage medium" used herein should be expansively construed to cover any volatile or non-volatile computer memory suitable to the presently disclosed subject matter.

Usage of conditional language, such as "may", "might", or variants thereof, should be construed as conveying that one or more examples of the subject matter may include, while one or more other examples of the subject matter may not necessarily include, certain methods, procedures, components and features. Thus, such conditional language is not generally intended to imply that a particular described method, procedure, component, or circuit is necessarily included in all examples of the subject matter. Moreover, the usage of non-conditional language does not necessarily imply that a particular described method, procedure, component, or circuit is necessarily included in all examples of the subject matter. Also, reference in the specification to "one case", "some cases", "other cases", or variants thereof, means that a particular feature, structure or characteristic described in connection with the embodiment(s) is included in at least one embodiment of the presently disclosed subject matter. Thus, the appearance of the phrase "one case", "some cases", "other cases", or variants thereof, does not necessarily refer to the same embodiment(s).

The operations in accordance with the teachings herein may be performed by a computer specially constructed for the desired purposes, or by a general-purpose computer specially configured for the desired purpose by a computer program stored in a non-transitory computer-readable storage medium.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

With an attempt to facilitate the live atmosphere of the game to the player, that operates a remote gaming application, via a player's device, while maintaining, the presently disclosed subject matter includes a gaming environment that enables a player to participate, in real-time, using his device, in an interactive live game. The interactive live game that is displayed to the player may include a Random Number Generation (RNG) based game, where the RNG based math, played in traditional physical machines, such as slot machines, are integrated, and operated by a real-time based shared live game server. The RNG based game math maybe operated by a gaming server which may communicate directly with the player and to generate events pertaining to the operated primary game.

The RNG based game math, together with the visual presentation of the game, virtual reality environment and a live video stream from a live studio capturing a live operator, are integrated into a composited video stream, in a synchronized manner. The resulting composited video stream includes presentation or display as if the RNG based game is being operated in a virtual reality environment, where, during execution of the game, themes of the environment can be switched from one to another. In addition, a live operator is also presented as if existing in this virtual environment. The remote player can participate, in real-time, in an interactive live game, in a smooth and synchronized manner. Optionally, the player can participate in a game with other players playing the same game. Further details with respect to composition of the executed game to be displayed on the player's device are provided further below with respect to FIGS. 6-8.

Bearing this in mind, attention is drawn to FIGS. 1-5 illustrating several examples of optional screenshots of a gaming application, in accordance with certain embodiments of the presently disclosed subject matter. The gaming application enables a player, using his player's device, to participate in a game, such as an RNG based game. In this example, the RNG based game is a slot machine game. FIG. 1 illustrates a screenshot 100. As shown in screenshot 100, the screen that is displayed to the player can comprise several separate areas of content, shown in an integrated and synchronized manner on the player's device. Content area 110 may include a virtual environment comprising a plurality of themes. The themes can be different from one another. The virtual environment in content area 110 displays one theme 120 of the plurality of themes, in this case, a virtual street with shops. In some examples, content area 110 and the theme that is displayed cover a major portion of the screen in the gaming application, to enhance the player's experience, as if he is present in the virtual environment.

Screenshot 100 may further comprise a game content area 150, such as a slots game. The game content area 150 may be displayed as if running in the virtual environment. The game content area 150 may include a visual display of a slots game running in real-time, and in which the player can participate. The screenshot 100 may also include a chat content area 170. If a player wishes to add comments, he can add them, e.g., by sending them to the server executing the game (as explained further below), and the comments may be displayed in the chat area. In cases where a plurality of players are participating in the game, the chat area can display comments received from the plurality of players. Screenshot 100 may further comprise a video of a live physical studio. The video of a live physical studio can be captured by a camera located at the studio. The live physical studio can be occupied by a live operator, e.g., a game operator 130 operating a mobile activation button 140, in this case, a wireless microphone. As illustrated in screenshot 100, in some examples the captured video from the live studio that is displayed in the gaming application includes the live operator 130 and the mobile activation button 140 only. Some information 160 relating to the game or information that pertains to the particular player may be displayed, as shown at the bottom of the screen. For example, the information may include the current balance of the player, or data that pertains to the player's actions or status in the game, e.g., if the player won a bet. In some examples, the information may include real-time statistics, e.g., statistics for a slots dashboard.

Figure 2:
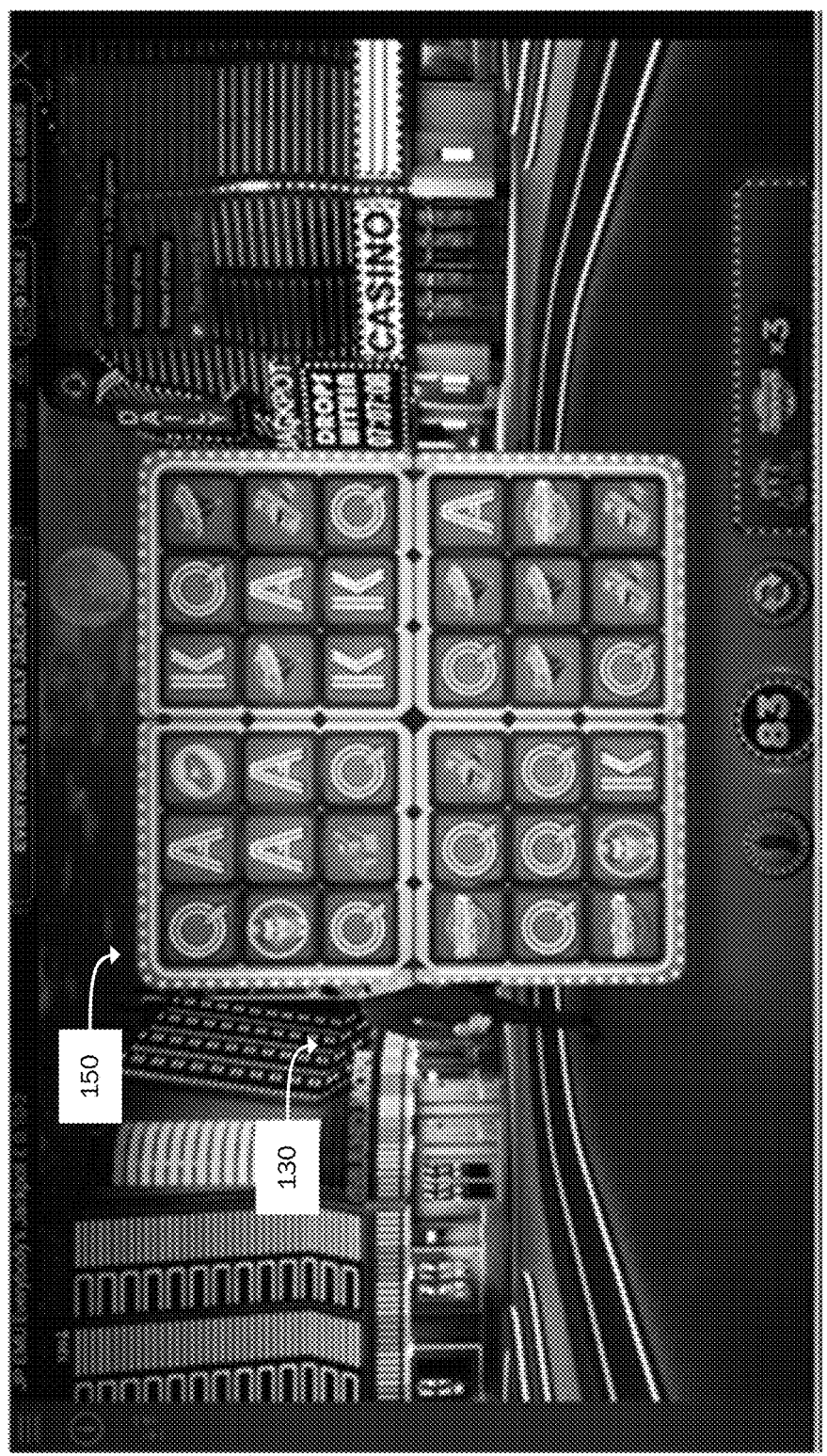

FIG. 2 illustrates a screenshot 200. In screenshot 200, content area 110 includes the same theme 120 displayed in FIG. 1, and further illustrates that operator 130 now moves to another area in the live physical studio. The corresponding display of the gaming application on the player's device illustrates as if the operator 130 moves "behind" the gaming content 150, thereby positioning the operator 130 in a different position in each theme.

Figure 3:
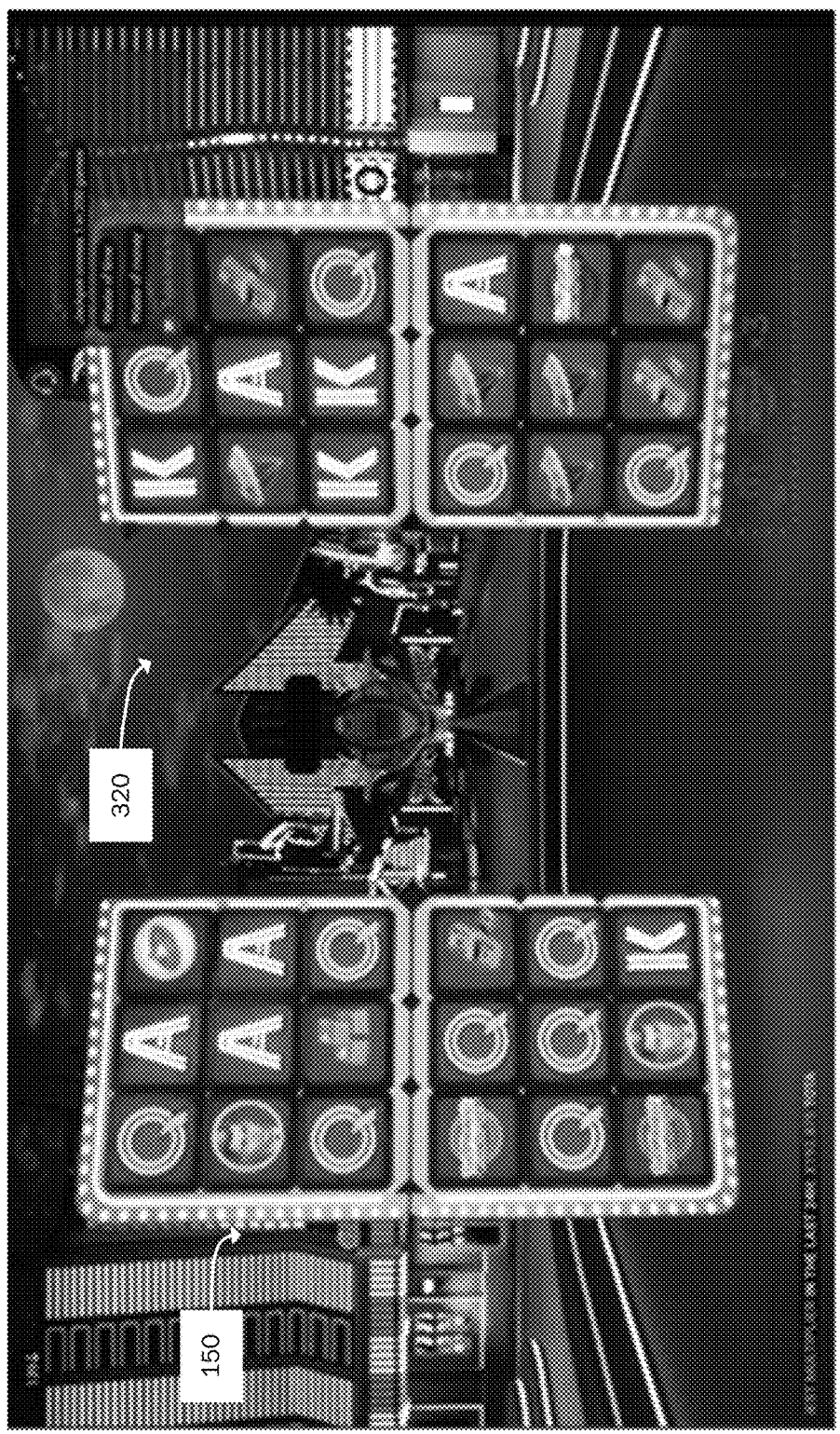

FIG. 3 illustrates a screenshot 300. In screenshot 300, content area 110 includes the same theme 120 displayed in FIG. 1, with a transition to a second, different theme, 320 from the plurality of themes included in the virtual environment of the gaming application. As illustrated, the transition to another theme includes the game content area 150 as if opened, such that the second theme 320 is revealed. In screenshot 300, the captured video from the physical studio has no presentation, e.g., such that a captured video of the physical studio is covered by virtual elements.

Figure 4:
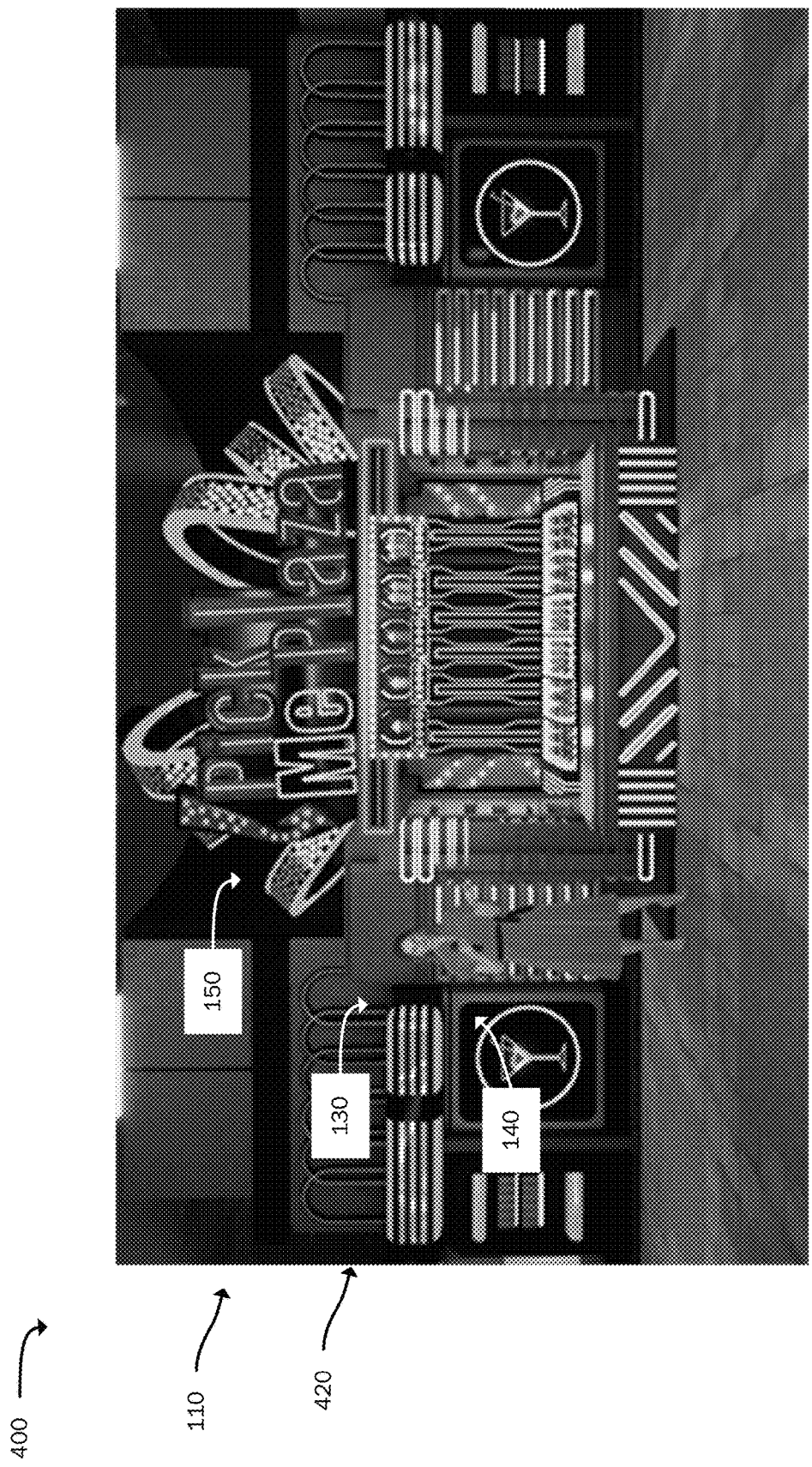
Figure 5:
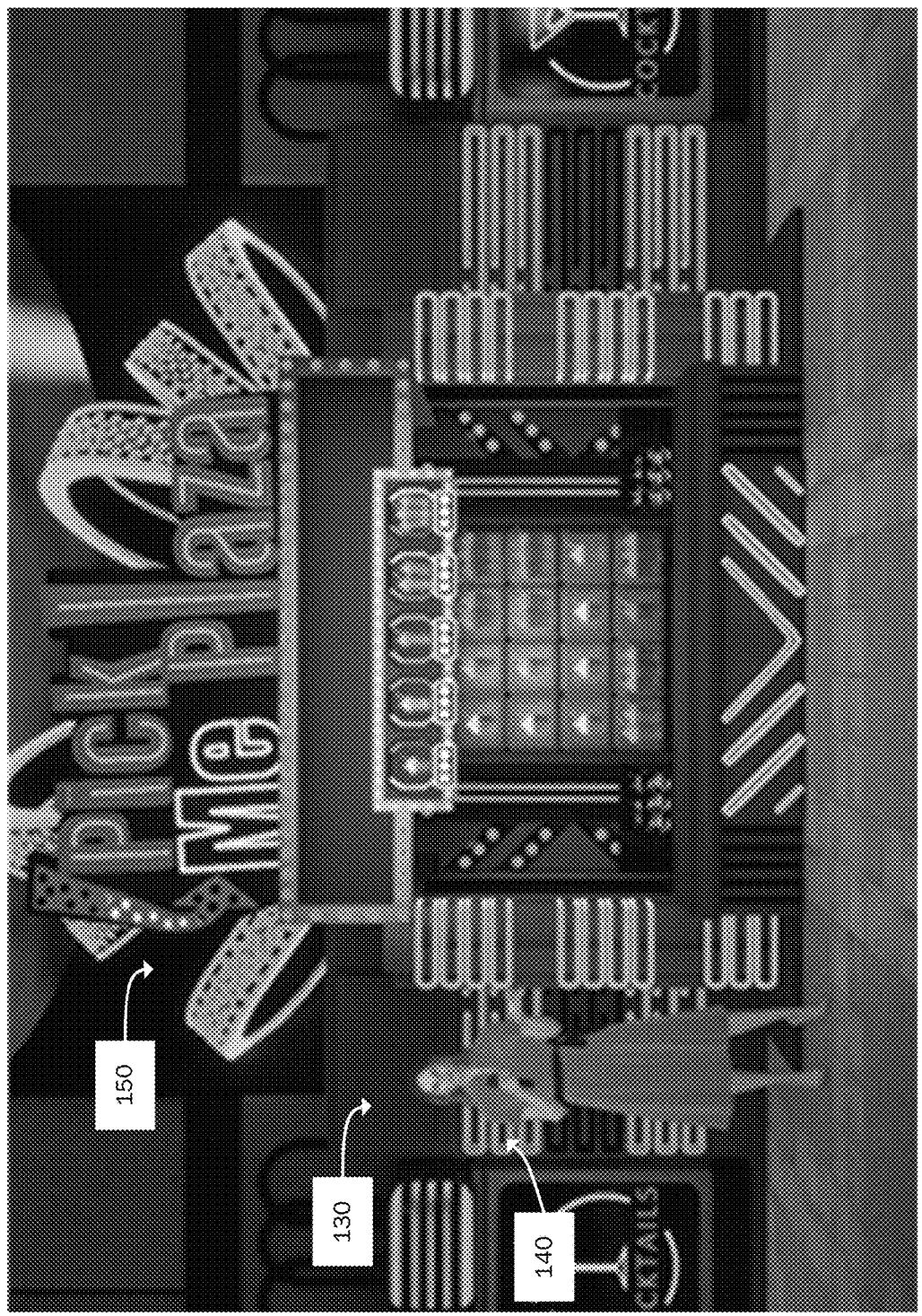

FIGS. 4 and 5 illustrate the gaming application with a third, different, theme 420 of the plurality of themes in the virtual environment. As illustrated in FIG. 4, the operator 130 with the mobile activation button 140 captured in the live studio are displayed, near game content area 150. As illustrated in content area 150 in FIG. 5, the operator 130 can operate, using the mobile activation button 140, the same or a different game, such as a bonus round now displayed on the player's device, with theme 420 at the background.

Inclusion of a live operator 130 in the gaming application contributes to the player's experience as if he is present in the virtual environment. One advantage of the activation button 140 being mobile is that it enables the operator 130 to freely move around the studio, irrespective of the theme that is displayed or any transition of two themes.

The functioning of the computer gaming system is also improved by the usage of the activation button 140, as the computer system can execute the interactive live game, in real time, including a virtual reality environment comprising a plurality of themes, and to switch between the themes in the games, in a smooth manner to the player, without being limited to display of static elements that are fixed in the studio. Also, the gaming system can operate without any indication from the live studio, or the operator of his location in the live studio, or any constrains or interruptions relating to the operator 130 in the live studio, while continuing to execute the game in a smooth manner to the player.

As illustrated in FIGS. 1-5, the virtual environment includes several different themes 120, 320, and 420, where the operator 130 is positioned in a different position in each of the themes. Had the mobile activation button 140 been static in the studio, then the operator 130 operating the mobile activation button 140 would have to be static as well, which would detract from the real world atmosphere that the virtual reality aims to achieve. The free movement of the operator in the studio, which enables the gaming system to switch between different themes without being limited to the position of the operator 130 in the live studio, is achieved by the activation button 140 being mobile.

It should be noted that screenshots 100-500 are non-limiting examples of displaying the gaming application on the player's device. Those skilled in the art will readily appreciate that the teachings of the presently disclosed subject matter are, likewise, applicable to other arrangements of elements or content areas on the display screen.

For purpose of illustration only, the following description is provided for RNG based games, e.g., of slot games type. Those skilled in the art will readily appreciate that the teachings of the presently disclosed subject matter are, likewise, applicable to other RNG based games, such as Roulette.

Figure 6:
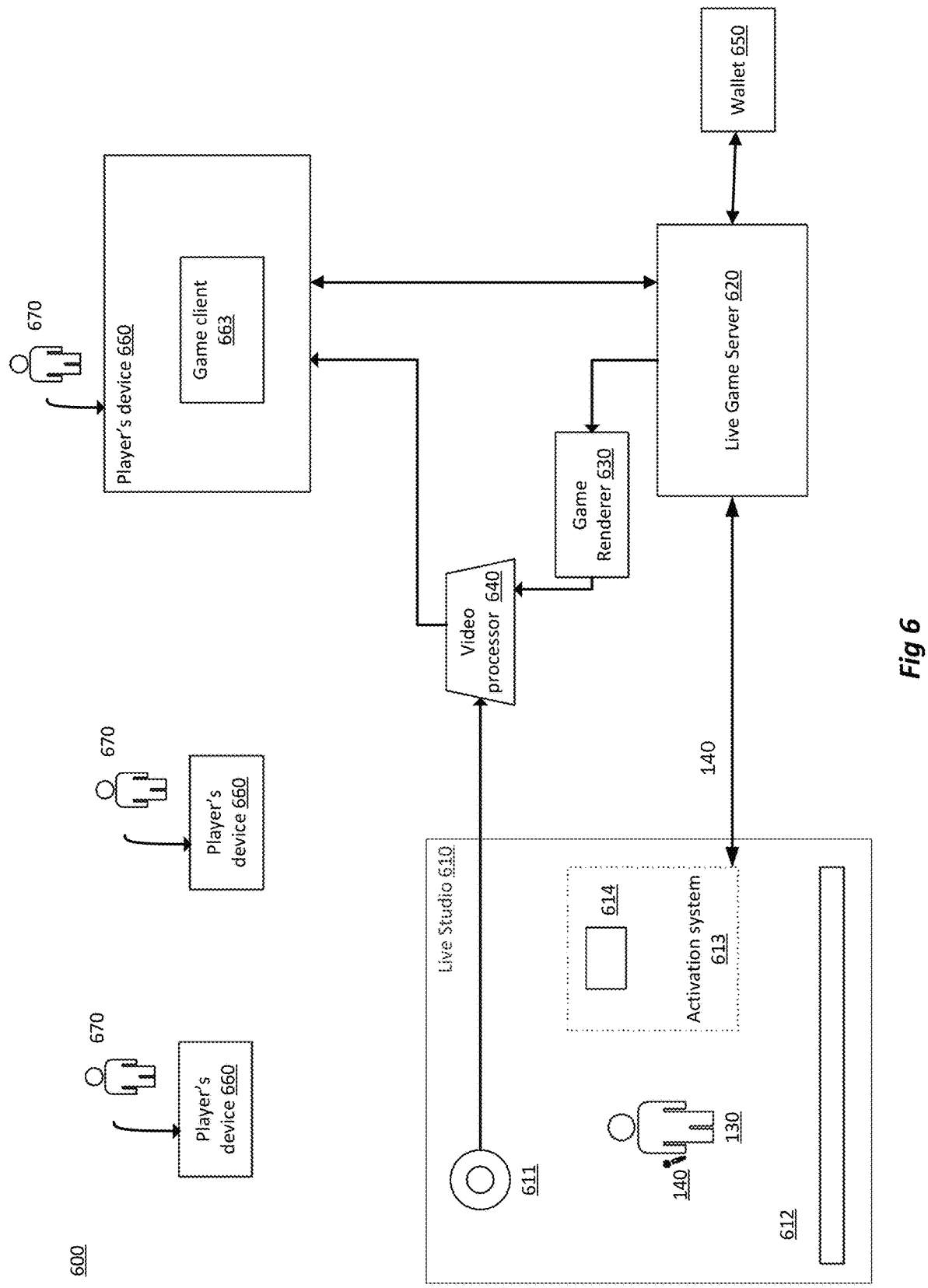
FIG. 6 illustrates a high-level illustration of a computerized gaming environment 600 in accordance with certain embodiments of the presently disclosed subject matter.

Bearing this in mind, attention is drawn to FIG. 6 illustrating a generalized diagram of a computerized gaming environment 600 comprising elements in a gaming system, in accordance with certain embodiments of the currently presented subject matter. Computerized gaming environment 600 and gaming system are configured to enable execution of an interactive live game, incorporated in a virtual reality environment, in real-time. In some examples, the gaming system includes several entities, all operatively communicating via a network, including a live game server 620, game renderer 630, video processor 640, and, optionally, one or more cameras 611 positioned in the live studio 201. The entities in the gaming system may operatively communicate with other entities in gaming environment 600 such as with elements in live studio 201 such as activation system 613, with wallet 650, and one or more player's devices 660.

Operator 130 may also participate in execution of the game by operating an activation button 140, for example, to initiate bonus rounds or perform a certain action of the game. Activation button 140 may be mobile. In some examples, mobile activation button 140 may be a wireless microphone including wireless buttons and a communication unit (not shown) enabling the operator 130 to operate the activation button 140. The live studio 201 may also include an activation system 613. Activation system 613 is configured to communicate with the mobile activation button 140 to receive inputs from the operator 130, e.g., to initiate a bonus round. Activation system 613 is further configured to communicate the inputs to the live game server 620 which executes the live game, as described further below. In some examples, the activation system 613 can be comprised in the activation button 140. The advantages of the wireless buttons and microphone in activation button 140 along with activation system 613 which communicates the input to live game server 620 for the operation of the game, are further described below.

Live studio 201 may also comprise a screen 614 which may display to the live operator 130 data that pertains to the executed game or the players. For example, screen 614 can display to operator 130 a version of presentation of the game (e.g,. the same executed game display that is displayed on the players' devices, or a subset of the display), information on the participating players or players' actions, etc.

The studio 610 may include background surface 612. Background surface 612 may be used, as in known green-screen technology, as an initial image for later compositing visual content on the background surface 612, such as display corresponding to an executed game and virtual reality environment. The virtual reality data may include a virtual reality environment comprising one or more themes, that can be switched from one to another.

The live studio 201 may also include at least one camera 207 which is configured to capture a video of the live studio 201. In some examples, the area that is captured by camera 207 includes the background surface 612, the live operator 130, and the mobile activation button 140. Camera 207 is configured to capture a video of the live studio 201 and to live stream the captured video, to a video processor 666 included in the gaming system, which may be located outside the live studio 201.

As illustrated at least in FIGS. 1-5 and from the description of FIG. 6, the mobility of the activation button 140 and the lack of any static and physical elements fixed in live studio 610, facilitate the operator 130 to freely move around the live studio 610, irrespective of the theme that is displayed on the background surface 612 during execution of the gaming application, and enables the gaming application to switch between the themes of the virtual environment, in a smooth manner to the player 670, without being limited by display of static elements or an activation button 140 that may be fixed in studio 610.

In some cases, gaming environment 600 and gaming system include a live game server 620. Live game server 620 operatively communicates with live studio 201 and is configured to generate and execute interactive games, such as RNG based games. Live Game Server 620 is configured to generate typical game functionality, such as typical slots functionality, and to operate a virtual reality mode of the game, e.g., by generating virtual reality data pertaining to the game. The live game server 620 is further configured to store data pertaining to virtual reality data. The virtual reality data may include one or more themes operated within a virtual reality environment executed in the game. Further details of the functioning of the live game server appear below with respect to FIG. 7.

In some examples, gaming environment 600 and gaming system further include game renderer 630 and video processor 640. Game renderer 630 operatively communicates with both live game server 620 and video processor 640. Live game server 620 executing the current games is configured to transmit to game renderer 630 data indicative of the current executed games. For example, in the slot games type, live game server 620 is configured to transmit to game renderer 630 game display data that pertains to the current spin of reels, the next stop of the spinning, with the shape on the reels in the next stop, optionally, with the time that the reels should be stopped. Game renderer 630 is configured to receive game display data and to determine game display data that corresponds to operation of the executed game, by determining the visual display of the reels, with the shape on the reels, when they stopped spinning. In some examples, game renderer 630 is configured to generate a respective game video based on the visual display data, and to transmit game video to the video processor 640.

In addition, live game server 620 is further configured to transmit to game renderer 630 virtual reality data pertaining to the executed game. For example, virtual reality data may include data pertaining to a current virtual reality environment and a current theme of the plurality of themes to be displayed. Live game server 620 is further configured to transmit to game renderer 630 data pertaining to one or more additional themes of the plurality of themes, and data pertaining to the transition between the themes, e.g., the time that two themes should be switched. For example, if the live operator 130 pressed the activation button 140, data indicative of the input of the live operator 130 may be sent to live game server 620. In response to receipt of such an input, game server 620 is configured to transmit to game renderer 630 virtual reality data comprising transition data indicative of switching between at least two themes in the environment. Game renderer 630 is configured to receive the virtual reality data and to determine the respective display of the virtual environment and the themes that correspond to operation of the executed game, including e.g., which theme should be displayed and when, display of transitioning between two themes resulting in a display of another themes than the one that was displayed until the transition.

In some cases, game renderer 220 is configured to create a video of the game, and to transmit the video of the game, including the game display data and the virtual reality data, to video processor 640. Video processor 640 included in gaming environment 200 operatively communicates with live studio 201. In cases where live studio 201 includes background surface 612 of a green screen type or the like, video processor 640 is configured to receive the captured video from camera 207, including the background surface and a live operator that operates in the studio 201, receive the game display data and the virtual reality data from the game renderer 630, and to create, using known per se techniques a live game video stream. The live game video stream can include a video including the captured video of the live studio with the operator (e.g., operator 130 holding activation button 140 in FIG. 1), a theme in a virtual environment (e.g., theme 120 in FIG. 1) and display of the executed game (e.g., game content area 150 of FIG. 1). In some examples, video processor 640 is configured to store the live game video stream in an accessible predefined database operatively communicating with video processor 640 (not shown).

In some examples, video processor 640 is separated from game client 663 and is configured to operatively communicate with game client 663. Having game client 663 as a separate unit to video processor 640 is advantageous and facilitates sharing the interactive RNG based game between a plurality of players. While in known systems a single player operates a gaming application on the player's device by game client 663, and the game client 663 includes a component that determines the visual presentation of the game, according to the presently disclosed subject matter, operating the game renderer 660 outside gaming client 663 and sending a video including the visual display of the game with the virtual environment and the themes that should be displayed to game client 663, enables the game renderer to share the same visual presentation of the game to more than one player's device. Alternatively, or additionally, game renderer 660 and/or video processor 640 can be comprised in live game server 620. Yet, alternatively, or additionally, game renderer 660 can be comprised in video processor 640.

In some cases, gaming environment 600 includes one or more players' devices 660 each operated by a player 670 for participating in a game. A player 670 can send a request through player's device 660 running a dedicated game application, to participate in an interactive live game. The request can be sent to live game server 620. Live game server 620 is configured to receive the request of the player 670 and to execute an interactive game. In some examples, live game server 620 is configured to constantly execute the interactive game, to receive the player's request, and to enable participation of the player 670 in the already executed interactive game. Constant execution of games may include slot games, in which the reels are spinning, irrespective of participation of a player in the game. The player 670 who joins the executed game may place a bet in the next round to start using his device 660. In some examples, live game server 620 is configured to receive the player's request, and only then to start executing the interactive game. Starting execution of the interactive game only upon receipt of the player's request may be for example in a Blackjack game, where the game cannot be executed without a player. Once the request of the player 670 to participate in the executed interactive game is received at live game server 620, live game server 620 is configured to execute the game (if not already executing the game), and to generate game events. The generated game events pertain to the executed game and correspond in time to the live game video stream, including a captured video from the live studio with the display game data and the virtual reality data. Some examples of game events include a start of a new round, result available, end of a round, and errors. In some examples, at least some of the events correspond to a player's actions in a game, and are generated in response to receiving data indicative of the player's 670 action in the executed interactive game. Some examples of events generated in response to receipt of data indicative of player's actions include receiving a new bet of player 670, auto-play started, and win or loss of a player 670 in a game round.

Live game server 620 is configured to transmit the generated game events to the player's device 660. The generated game events can be used by player's device, e.g., by game client 663, to display information to the player 670.

In some examples, the game client 663 in player's device 660 is configured to obtain the live game video stream from the video processor 640 including the video of the live studio, the game display data and the virtual reality data, and, in addition, to receive the generated game events from the live game server 620, and to create a composited synchronous video. The composited synchronous video constitutes the interactive live game, by which the player can participate in the game.

In some examples, obtaining the video from video processor 640 e.g., by downloading the video from an accessible predefined database operatively communicating with video processor 640 takes a certain time duration, e.g., a few seconds, whereas receiving the generated game events, which correspond in time from the live game server 620, takes only a few milli-seconds. Therefore, before creating the composited synchronous video, player's device 660 is configured to synchronize between the a-synchronously received game events and the obtained live game video stream. Player's device 660 e.g., using a synchronization module included in game client 663 (not shown), may be configured to synchronize between a-synchronously received data in order to execute the game on the player's device 660. In order to enable the player's device 660 to synchronize between the a-synchronously received data (live game video stream and game events), both the live stream video, as well as the generated game events, may include sync data. The sync data may facilitate the player's device 660 to synchronize between the a-synchronously received data, and only then to create the composited synchronous video. In some examples, the game events generated by live game server 620 may be modified to include or be associated with sync data, such as associated time stamps based on a global clock indicating the time that the events were generated. The live game video stream generated by the game renderer 630 which includes the virtual reality data, the game display data, and the captured live video, can also be associated with sync data, such as associated time stamps based on the global clock, indicating the time that the video was captured in the live studio 201.

In some examples, player's device 660 can receive the game events with the sync data from the live game server 620, and a-synchronically receive the live game video stream from video processor 640 and to sync between the received data. For example, player's device 660 can sync between the received data based on the time stamps, and delay any earlier data that is received, until later data that is time stamped with the same time stamp, is received. Further details on synchronizing between a-synchronically received data is further explained in e.g., European publication number 3827889 published Jun. 2, 2021, the content of which is entirely incorporated herein by reference. However, a person versed in art would realize that other known per se methods for synchronizing between the a-synchronically received data items, which enable the operation of an interactive live game, may be applied here.

In some cases, gaming environment 600 further includes wallet 650. Wallet 650 may include one or more e-Wallet applications associated with player 670, and enables player 670 to manage financial transactions relating to executed games, e.g., placing bets in a game. Wallet 650 operatively communicates with live game server 620, and, when necessary, live game server 620 is configured to communicate with wallet 650 to receive a grant for an action of the player, or to communicate data relating to financial transactions based on the player's activity in the executed game.

Figure 7:
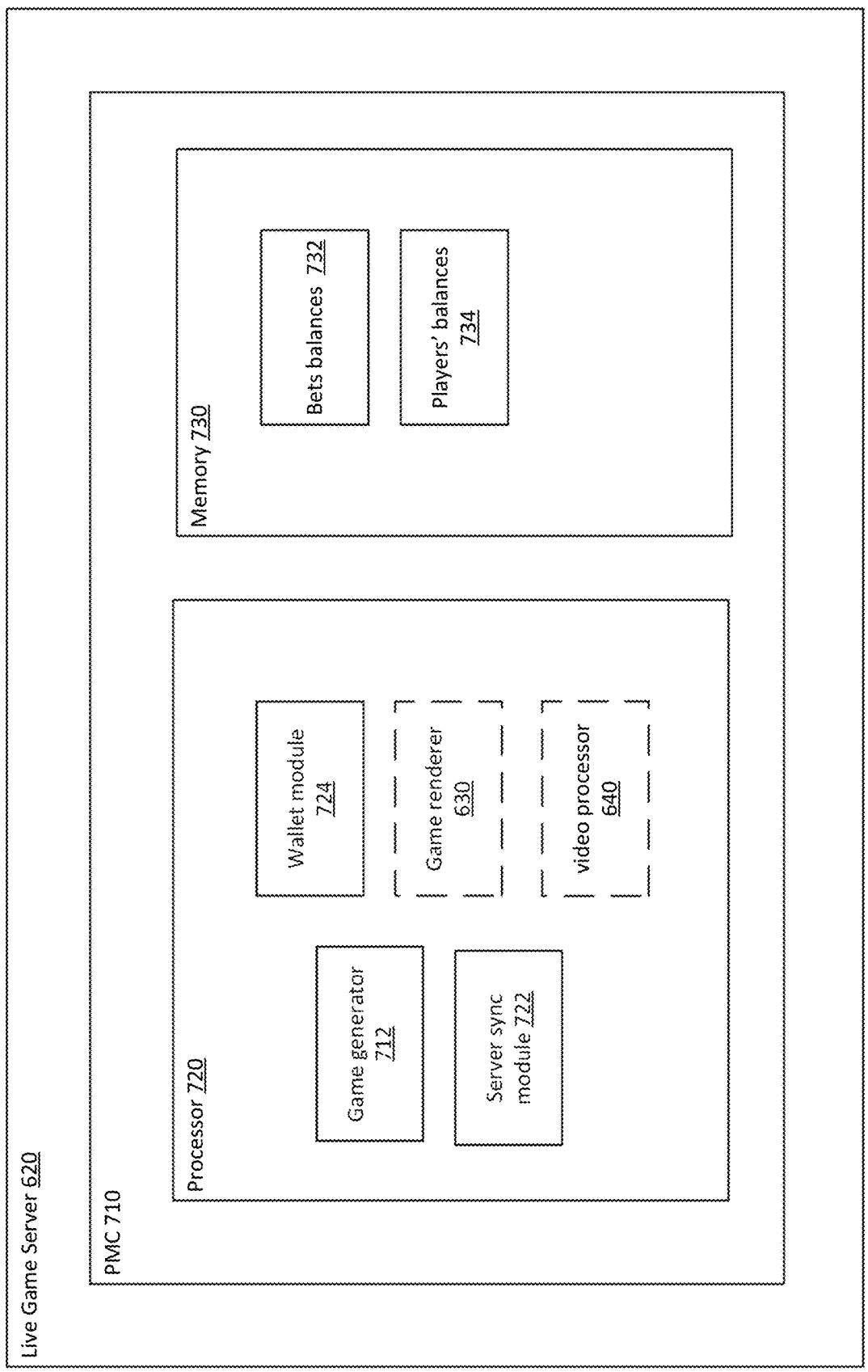
FIG. 7 illustrates a high-level functional block diagram of a live game server 620, in accordance with certain embodiments of the presently disclosed subject matter.

Reference is now made to FIG. 7 illustrating a functional block diagram of live game server 620. The illustrated live game server 620 includes a processor and memory circuitry (PMC) 710 comprising a processor 720 and a memory 730. The processor 720 is configured to execute several functional modules in accordance with computer-readable instructions implemented on a non-transitory computer-readable storage medium. Such functional modules are referred to hereinafter as comprised in the processor 720. The processor 720 can comprise game generator 712, server sync module 722, and wallet module 724. In some examples, the processor 720 can further comprise game renderer 630 and/or video processor 640 of FIG. 6.

In some examples, processor 720, e.g., using game generator 712, is configured to execute an interactive live game, while generating typical game functionality and math, such as typical slots functionality. Executing the interactive live game includes generating game events. Game generator 712 is further configured to receive a player's request to participate in an interactive live game, and to generate at least some of the events in response to receiving data indicative of a player's action in the executed interactive live game. Some examples of game events are generated during execution of the game and may include a start of a new round or end of a round. In addition, game events generated in response to receiving data indicative of a player's action in the executed interactive live game may include receiving a new bet of player 670 and winning or losing of a player 670 in the current round, based on a player's bet and current status of the game.

Based on the executed game, game generator 712 is configured to transmit to game renderer 630, game display data that pertains to execution of the game, such that game renderer 630 can determine the corresponding game display data to later transmit the determined game display data to video processor 640. Game generator 712 is further configured to transmit to game renderer 630 virtual reality data, such that game renderer 630 can determine the virtual reality environment with the themes to transmit to video processor 640.

Processor 720 further includes server sync module 722 that is configured, prior to transmitting the generated game events to the player's device 207, to associate the generated game events with sync data such that the player's device 660 can sync the received data with the a-synchronically received live game video stream.

In some examples, live game server 620 is configured to operatively communicate with one or more e-wallet applications 650 where financial transactions relating to the executed games are involved. In such cases, wallet module 724 included in processor 720 is configured to communicate data with wallet application 650 associated with a particular player participating in the interactive live game.

PMC 710 further includes memory 730. Memory may store bets balance 732 and players balance 734. In some examples, bets placed by the players, and actions taken by the players, are monitored. Data which pertains to the monitoring of the bets and/or the players, may be stored in bets balance 732 and players balance 734, and may be used in the execution of the game.

It is noted that the teachings of the presently disclosed subject matter are not bound by the gaming environment 600, the gaming system, the live game server 620 or by the player's device 660 described with reference to FIG. 6. Equivalent and/or modified functionality can be consolidated or divided in another manner, and can be implemented in any appropriate combination of software with firmware and/or hardware and executed on a suitable device. For example, each one or both of game renderer 630 and video processor 640 can be comprised in live game server 620. The live game server 620 can constitute multiple live game servers operating in a shared manner in a live cluster of servers. Wallet application 650 can comprise a plurality of separate wallets (per each licensee of an interactive game) implemented on the same or on different servers; optionally, part of the functions of the separate wallets can be integrated in a centralized manner. Also, entities in gaming environment 600 may operatively communicate with each other via a network (not shown). Those skilled in the art will also readily appreciate that the data repositories/databases in memory 730 can be consolidated or divided in other manner; databases can be shared with other systems or be provided by other systems, including third party equipment.

Figure 8:
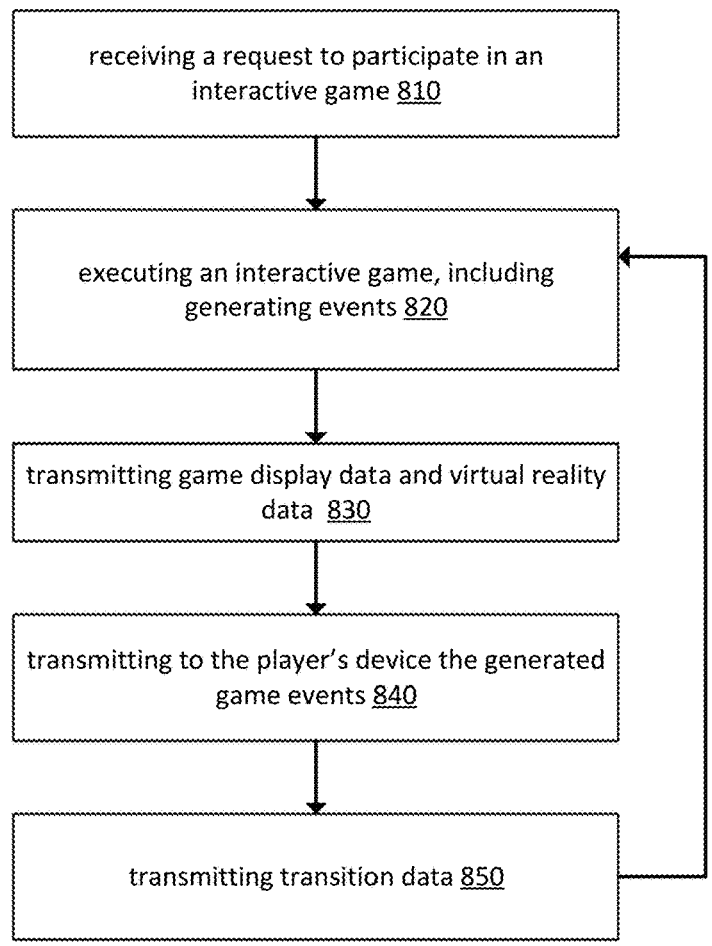
FIG. 8 illustrates a generalized flowchart of operations performed by the live game server, in accordance with certain embodiments of the presently disclosed subject matter.

Reference is now made to FIG. 8 illustrating a general flowchart 800 of operations executed in live game server 620, in accordance with certain embodiments of the presently disclosed subject matter. In some examples, the operations can be performed by entities in the environment 600 and live game server 620 illustrated with reference to FIGS. 6 and 7.

In some cases, the process initiates, by the live game server 620, receiving a request of a player 670 using his player's device 660 to participate in an interactive live game (block 810). In some examples, the request can follow a user selection received at a player's device 660 to participate in an interactive live game from several available games, and sending, by the player's device 660 to the live game server 620, a request including data on the selection. Once a request is received, live game server 620 using PMC 710 repeatedly performs several stages in order to execute the interactive game and enable the player to participate in the game.

Game generator 712 included in PMC 710 executes an interactive live game including generating game events (block 820). In some examples, PMC 710 receives the player's request, and only then game generator 712 starts executing the interactive live game. In some other examples, game generator 712 constantly executes the interactive live game. While executing the interactive game, PMC 710 receives the player's request, and enables participation of the player 670 in the already executed interactive live game. Constant execution of games may include slot games, in which the reels are spinning, irrespective of participation of a player in the game. The player 670 who joins the executed game may place a bet in the next round about to start.

Execution of the game includes, among others, generating game events. In some examples, at least some of the events correspond to the player's actions in the game, and are generated in response to the player's actions. For example, game generator 712 receives data from player's device 660 on a new bet placed by the player 670. In response to receiving such data, game generator 712 generates corresponding game events to the player 670 placing a new bet.

The game executed by the game generator 712 includes operation of the game, including determining the game rounds starts and ends, operating RNG, and such. Visual display of the game corresponds to the game operation. Hence, based on the executed game, game generator 712 can transmit game display data to video processor 640 (block 830). The game display data may include visual display of the game, based on the operation. For an ongoing executed game, the visual display changes together with the ongoing operation of the game. For example, for slot games, the visual display (also to be referred to as "visual presentation") of the symbols on the reels should correspond to operation of the game. The game display data can include a video or an image with the reels, with specific symbols displayed on the reels. In some examples, game generator 712 can send data which pertains to operation of the game to a game renderer 630. Game renderer 630 can determine the visual presentation of the game based on the operation, and then send a video including visual presentation of the game to the video processor 640.

In addition, based on the executed game, game generator 712 can transmit virtual reality data, including a virtual reality environment comprising at least two themes, to the video processor 640 (also included in block 830). Game generator 712 may generate virtual reality data and send it to the video processor 640. The virtual reality data may further include data pertaining to the virtual reality environment and the themes, such as which themes to display or when to switch between the themes.

As explained above, in addition, the video processor 640 can receive a captured video of a live studio 201 from camera 207. The live studio 201 may be occupied by an operator 130 operating a mobile activation button 140. Hence, the video captured by camera 207, which is transmitted to video processor 640, may include the operator 130 operating mobile activation button 140. The captured video portions may be associated with a video timestamp to assist the player's device 660 to synchronize with the game events at a later stage.

Together with the captured video, the video processor 640 uses the received game display data and virtual reality data to create a live game video stream. The live game video stream, including the video portions with the video timestamps, is then sent by the video processor 640 to the player's device 670.

The game events generated by game generator 712 pertain to the executed game and correspond in time to the live game video stream generated by video processor 640. The game events may be transmitted to the player's device 670 (block 840). Since the game events are sent to the player's device 660 separately from the live game video stream, and, optionally, from a different location, they may therefore be received at the player's device at different times than the receipt time of the live game video. The player's device 670 can therefore synchronize between the a-synchronically received data items. In some examples, synchronization between the a-synchronously received data can be done using a global clock. Hence, after generating the game events, server sync module 722 included in PMC 710 can associate the generated game events with sync data and only then to transmit the game events with the sync data to the player's device 670. Based on the sync data associated with each of the game events and the live game video stream, player's device 670 can sync between the different data items. In some examples, only a selected subset of game events is transmitted to the player's device 670. It should also be noted that associating the generated game events and transmitting the game events with the sync data to the player's device 670 should not be considered as limiting. Those skilled in the art will readily appreciate that the generated game events can be associated with sync data, but can be sent separately from the sync data to the player's device, and, yet, the player's device can create, based on the received generated game events and the received sync data, together with the live stream video, the composited synchronous video.

Once the player's device 670 receives the game events with the sync data and the live stream video, the player's device 670 can synchronize between the a-synchronously received game events and the obtained live game video stream, based on the sync data associated with the generated game events. For example, the player's device can match between the game events with video portions having corresponding video timestamps. In some examples, a corresponding timestamp is an event time stamp which is identical to a video timestamp. Alternatively, corresponding time stamps can be time stamps in which the time difference between the times indicated in the time stamps is not higher than a predefined minimal threshold. Further details on synchronizing between a-synchronically received data is further explained in e.g., European publication number 3827889 published Jun. 2, 2021, the content of which is entirely incorporated herein by reference. However, a person versed in art would realize that other known per se methods for synchronizing between the a-synchronically received data items, which enable the operation of an interactive live game, may be applied here.

Creating a composite video including the received data, without synchronizing between the received data, may result in a player who views content which does not match the video or display of the game. For example, without synchronizing between the received data, a player may be receiving a notification of a win, before the corresponding win display data is shown on the screen and while the game display still includes execution of the round. It is therefore advantageous to synchronize between the a-synchronously received data.

After synchronizing the received data, the player's device 670 can create a composited synchronous video comprising the obtained live game video stream and data that pertains to the transmitted game event. The composited synchronous video constitutes the interactive live game.

In some examples, a live operator such as live operator 130 of FIG. 1 is located in the live studio 201. The live operator can receive data that pertains to the executed game or the players, e.g., by screen 614. For example, screen 614 can display to operator 130 a version of display of the game (e.g., the same executed game display that is shown on the players' devices 660, or a subset of the display), information on the participating players 670, or players' actions, etc. In some examples, the live studio 201 also includes a mobile activation button 140. The live operator 130 can initiate bonus rounds or a certain action of the game using the activation button 140. In response, the live game server 620, communicating with the activation system 613 in live studio 201, can receive an input from the activation button 140, and, in response, may generate, e.g., using game generator 712, at least one game event. In some examples, in response to receiving an input from the mobile activation button 140, live game server 620 can transmit to the game renderer 630 virtual reality data including transition data indicative of switching between the at least two themes in the virtual environment (block 850). In some examples, the mobile activation button 140 may comprise wireless buttons that are mounted on a wireless microphone. The wireless buttons and microphone enable the operator 130 to freely move around the studio, irrespective of the theme that is displayed.

To illustrate one example of the above, with reference to FIGS. 1-5, FIG. 1 illustrates a virtual environment displaying one theme 120, the live operator 130 holding a wireless microphone 140 and the game that is running in game content area 150. The display shown in FIG. 1 is a composite video stream generated by a player's device 660. The composite video stream generated was generated from game events transmitted to the player's device 660 from live game server 620 and from live game video stream transmitted from video processor 640 to the player's device 660. The live game video stream was generated from a video captured by camera 207 in live studio 201. The video comprises the live operator 130 holding the wireless microphone 140 in live studio 201. The live game video stream was also generated from game display data (game content area 150) and virtual reality data (theme 120). The live operator 130 in FIG. 1 can press one of the wireless buttons on microphone 140 and initiate a slots round. The input from the microphone 140 is transmitted e.g., using Bluetooth communication, to activation system 613 of FIG. 6 (not shown in FIG. 1) and can be transmitted to live game server 620. The game generator 712 in live game server 620 receives the initiation and generates a game event corresponding to initiation of a round. The game event, after being associated with sync data, is transmitted to the player's device 670. In addition, in response to receipt of the input from microphone 140, live game server 620 can transmit virtual reality data including transition data indicative of switching between two themes in the environment. The transition may be as illustrated in theme 320 in FIG. 3, while the second theme may be displayed as illustrated by theme 420 in FIG. 4. FIG. 5 illustrates the second theme 420 with the new bonus round illustrated in game content area 150, as initiated by operator 130.

In some examples one or more game events corresponding to the input from the microphone 140 and the transition may be generated by the live game server 620, resulting in a transition game event indicative of a transition from one theme into another in the environment. Virtual reality data corresponding to the transition game event, such as the transmission from theme 120 to theme 320 or the transition from theme 320 to theme 420, may be transmitted to the video processor 640.

The synchronization of the game events with the live game video stream may be made based on sync data, in a similar manner to that described above.

In some examples, there are at least two themes that are different from each other, among the plurality of themes in the virtual environment. Transition between the themes can be made upon determination of the live game server 620 to switch between two themes, or in response to receipt of an input from the mobile activation button 140 operated by the operator 130 in the live studio. The transition between themes should be made in a smooth manner to enhance the feeling of a live atmosphere of the player 670 when participating in the interactive live game, in some examples, as if the player is indeed moving towards a new theme in a different "location", and "reaches" a new location, illustrated by a new theme. Optionally, some themes in the virtual environment are different from another, where the live operator should fit in different locations. The smooth transition between the themes and the execution of different themes are enabled, among others, due to the mobility of the activation button 140, and the lack of any fixed physical elements in live studio 610. Had the activation button 140 been fixed in the live studio 610 or had the live studio 610 includes some physical elements which are captured by camera and shown in the captured video, then the live game server 140 would not be able to transmit between two different themes in a smooth manner without reducing from the live atmosphere of the player 670 when playing the game.

As illustrated in FIGS. 1-5, the operator 130 may be positioned in a different position in each of the themes. For example, the position of the operator 130 in FIG. 1 is different to the position of the operator 130 in FIG. 2, which is partially "behind" the game content area, or of the position in FIG. 3 which is entirely "behind" the content area 150, or of the position in FIG. 4 which is near the content area again. The position of the operator 130 may pertain to the physical position of the operator 130 in the live studio 201. One technical advantage of the mobile activation button 140 through which an input is received at the live game server 620, is that it enables the operator 140 to freely move around the studio, irrespective of the theme that is displayed, or any transition of two themes. In some examples, the live operator 130 can move freely before, during, or after the switching of two themes, and may position himself in a manner which complies with the atmosphere that the executed game is trying to reflect to the player 670. To illustrate, in FIG. 2, the operator 130 moves toward an area which is "behind" the game (displayed in the game content area) until he reaches there and is totally hidden by the game itself in FIG. 3. He finally, "appears" again in FIG. 4 near the game. The live game server 620 functionality is improved, as the various themes can be switched, irrespective of where the live operator 130 resides in the live studio 201. Hence, the live game server 620 can operate without an indication from the live studio 201 of the location of the operator 130, or any constrains or interruptions relating to the operator 130 in the live studio, while continuing to execute the game in a smooth manner to the player 670.

It is noted that the teachings of the presently disclosed subject matter are not bound by the flow chart illustrated in FIG. 8, and that the illustrated operations can occur out of the illustrated order. For example, operations 810 and 820 or operations 830 and 840, shown in succession, can be executed substantially concurrently, or in the reverse order.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

The term real-time as used herein is meant to include near real-time i.e., operation in systems that may experience some internal delays.

Those skilled in the art will readily appreciate that various modifications and changes can be applied to the embodiments of the invention as hereinbefore described without departing from its scope, defined in and by the appended claims.

The invention claimed is:

1. A computerized method for facilitating execution of an interactive live game, the method comprising, by a processor of a game server:
    receiving from a player's device a request of a player to participate in an interactive live game;
    repeatedly:
        executing an interactive game, including generating game events;
        based on the executed game, transmitting, to a video processor, game display data and virtual reality data, the virtual reality data including data pertaining a virtual reality environment comprising at least two themes, wherein the transmitted data is used to create, by the video processor, together with a captured video of a live studio in which an operator operating a mobile activation button, a live game video stream;
        transmitting to the player's device the generated game events, thereby facilitating the player's device, after obtaining the live game video stream, to create a composited video stream comprising the live game video stream and data that pertains to the generated game events, the composited video stream constituting the interactive live game;
        wherein at least some of the events are generated in response to receiving data indicative of a player's action in the executed interactive game; and
        in response to receiving an input from the mobile activation button, transmitting transition data indicative of switching between the at least two themes in the environment.

2. The method of claim 1, wherein the at least two themes are different themes, and wherein the operator is positioned in a different position in each of the at least two themes.

3. The method of claim 1, further comprising:
    in response to receiving the input, generating a transition game event indicative of a transition from one theme into another in the environment; and
    transmitting virtual reality data pertaining to the transition game event.

4. The method of claim 1, wherein the mobile activation button comprises wireless buttons that are mounted on a wireless microphone and enables the operator to freely move around the studio, irrespective of the theme.

5. The method of claim 4, wherein the operator is positioned in a different location in at least two of the themes.

6. A computer game server for facilitating execution of an interactive live game, the server comprising a processing circuitry comprising at least one processor and computer memory, the processing circuitry being configured to:
    receive from a player's device a request of a player to participate in an interactive live game;
    repeatedly:
        execute an interactive game, including generating game events;
        based on the executed game, transmit, to a video processor, game display data and virtual reality data, the virtual reality data including data pertaining a virtual reality environment comprising at least two themes, wherein the transmitted data is used to create, by the video processor, together with a captured video of a live studio in which an operator operating a mobile activation button, a live game video stream;
        transmit to the player's device the generated game events, thereby facilitating the player's device, after obtaining the live game video stream, to create a composited video stream comprising the live game video stream and data that pertains to the generated game events, the composited video stream constituting the interactive live game;
        wherein at least some of the events are generated in response to receiving data indicative of a player's action in the executed interactive game; and
        in response to receiving an input from the mobile activation button, transmit transition data indicative of switching between the at least two themes in the environment.

7. A non-transitory computer readable storage medium tangibly embodying a program of instructions that, when executed by a computer, cause the computer to perform a method for facilitating execution of an interactive live game, the method comprising:
    receiving from a player's device a request of a player to participate in an interactive live game;
    repeatedly:
        executing an interactive game, including generating game events;
        based on the executed game, transmitting, to a video processor, game display data and virtual reality data, the virtual reality data including data pertaining a virtual reality environment comprising at least two themes, wherein the transmitted data is used to create, by the video processor, together with a captured video of a live studio in which an operator operating a mobile activation button, a live game video stream;
        transmitting to the player's device the generated game events, thereby facilitating the player's device, after obtaining the live game video stream, to create a composited video stream comprising the live game video stream and data that pertains to the generated game events, the composited video stream constituting the interactive live game;
        wherein at least some of the events are generated in response to receiving data indicative of a player's action in the executed interactive game; and
        in response to receiving an input from the mobile activation button, transmitting transition data indicative of switching between the at least two themes in the environment.

8. A gaming system for facilitating execution of an interactive live game, the gaming system, comprising:
    a live game server configured to:
        receive from a player's device a request of a player to participate in an interactive live game; and
        repeatedly:
            execute an interactive game, including generating game events;
            transmit, to a video processor, game display data, and virtual reality data, the virtual reality data including data pertaining a virtual reality environment comprising at least two themes;

transmit to a player's device the generated game events; wherein at least some of the events are generated in response to receiving data indicative of a player's action in the executed interactive game; and wherein, in response to receiving an input from the mobile activation button, transmitting transition data indicative of switching between the at least two themes in the environment;

at least one camera positioned in a live studio is configured to capture a video of a live studio in which an operator operating a mobile activation button to create a live game video stream and to live stream the captured video;

a game renderer configured to receive the data pertaining to the game display data and the virtual reality data from the live game server, to determine game display data and virtual reality data, and to transmit the determined data to a video processor;

a video processor configured to receive the captured video from the at least one camera, receive the game display data and the virtual reality data from the game renderer, to create a live game video stream, and to transmit the live game video to the player's device;

thereby facilitating the player's device, after obtaining from the video processor the live game video stream, together with the game events, to create a composited synchronous video comprising the obtained live game video stream and data that pertains to the game events, wherein the composited synchronous video constitutes the interactive live game.

* * * * *